(No Model.)
J. M. BURROWS.
PLOW.
No. 334,106. Patented Jan. 12, 1886.
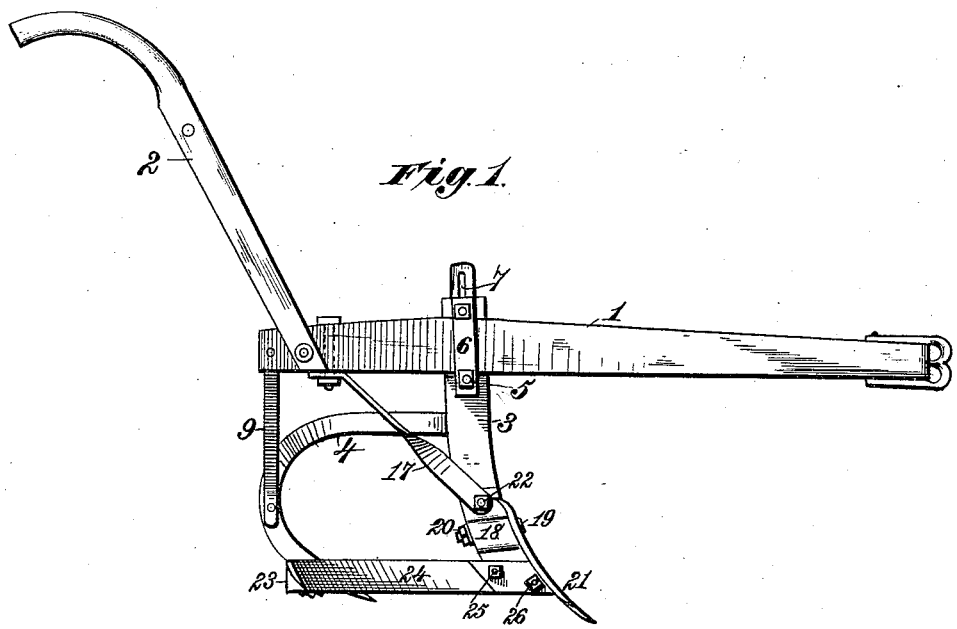
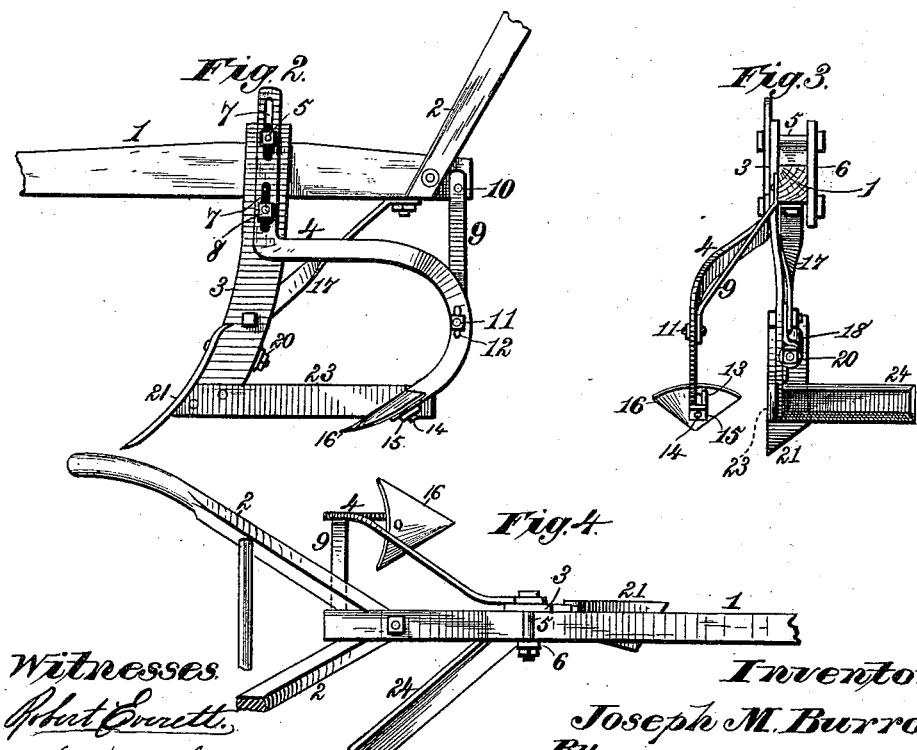
Witnesses
Robert Everett
N. K. McCready
Inventor
Joseph M. Burrows
By James L. Norris
Atty.

UNITED STATES PATENT OFFICE.

JOSEPH M. BURROWS, OF HAWKINSVILLE, GEORGIA.

PLOW.

SPECIFICATION forming part of Letters Patent No. 334,106, dated January 12, 1886.

Application filed September 8, 1885. Serial No. 176,525. (No model.)

*To all whom it may concern:*

Be it known that I, JOSEPH M. BURROWS, a citizen of the United States, residing at Hawkinsville, in the county of Pulaski and State of Georgia, have invented new and useful Improvements in Plows, of which the following is a specification.

My invention relates to an improved cultivator-plow, in which the plow-standard and an independent cultivator-shank are coincidently secured to the plow-beam, by means of a clamping-plate, with bolts and nuts, all so arranged that said standard and cultivator-shank will be capable of adjustment vertically, or to any required angle with the plow-beam. The cultivator-shank and the plow-standard are also each connected separately with the plow-beam by means of braces, that arranged for the plow-standard being pivotally connected thereto, while the cultivator-shank and its brace also have adjustable connection.

The invention consists in various peculiarities in the construction and combination of parts, as hereinafter set forth, whereby are combined the advantages of durability and simplicity of structure with facility of operation and decreased cost of manufacture.

In the annexed drawings, illustrating the invention, Figure 1 represents my improved plow and cultivator in side elevation, viewed from the right. Fig. 2 is a view of the left side, with beam and handles partly broken away. Fig. 3 is a rear elevation with handles removed. Fig. 4 is a top view.

The reference-numeral 1 designates a plow-beam having handles 2, as usual, and provided with ordinary draft devices. To this beam are adjustably secured a plow-standard, 3, and a cultivator stock or shank, 4, by means of bolts 5, passed through said standard and shank, which are arranged on one side of the plow-beam, and through a clamping-plate, 6, on the opposite side, one of said bolts being passed above and one beneath the plow-beam. The plow-standard 3 and cultivator-shank 4 are thus securely clamped to the plow-beam 1 in any desired position. It will be observed that the upper end of the cultivator-shank 4 is bent upward parallel with the standard 3, against which it rests, and is provided with longitudinal slots 7, for the passage of the screw-bolts 5, the parts being secured by nuts 8 on the ends of said bolts in such a manner that by loosening the nuts the plow-standard and cultivator-stock can be turned to any required angle with relation to the beam, and the cultivator-stock can be adjusted vertically as desired, by reason of the slots.

To the rear end of the beam 1 on one side is attached a brace, 9, by means of a pivot-bolt, 10. The lower end of this brace 9 is connected to the cultivator-shank 4 by means of a bolt, 11, passed through a slot, 12, so that by loosening a nut on said bolt the cultivator is allowed a vertical adjustment. The lower end of the shank 4 is curved upward on itself, as shown in Fig. 3, to form a box or bearing, 13, for the bolt 14 and nut 15, by which the cultivator-point 16 is attached. It will be observed that the box or bearing 13 is elongated, so as to allow the cultivator-point 16 to have a vertical adjustment independent of its shank.

As before observed, the plow-standard 3 and cultivator-shank 4 are so connected to the plow-beam as to be capable of adjustment back and forth to any required angle. This adjustment is facilitated by the pivotal connection of the beam 1 and brace 9, by which the cultivator-shank is steadied. The plow-standard 3 is pivoted to the lower end of a brace, 17, the upper end of which is firmly bolted to the plow-beam. The pivotal connection of the plow-standard 3 and brace 17 affords a support for the standard while being adjusted, the brace 17 also serving to steady the standard and attached parts when secured to the beam.

To one side of the standard 3 is secured a box, 18, that forms a bearing for the heel-bolt 19 and nut 20, by which the plow 21 is secured. This box 18 is made in a strong and substantial manner, of a width equal to that of the standard 3, to which it is firmly secured by bolts 22, and in connection therewith affords a firm support or bulk-head for the plow. The lower end of the standard 3 carries the wings 23 and 24, which are firmly secured in place by bolts 25 and nuts 26, so as to be capable of removal. One of these wings, as 23, is secured to the left side of the plow-standard 3, and extends horizontally backward to form a guide-bar or landside. The wing or sweep 24 is secured to the right side of the plow-standard, and is so formed and arranged as to occupy a vertically and longitudinally inclined position with reference to the plow-beam and landside, the inclination or angle of said wing 24 being made greater or less, according to the class of work for which the plow is intended. Being removable, this wing may be detached and replaced by another of greater or less inclination whenever required. The wings are made in various sizes and degrees of inclination, according to the varying requirements of the work to be accomplished. The horizontal guide-bar 23 steadies the entire plow-frame when at work and causes the plows or cultivator-blades to run more regularly in cutting desired depths. It also serves as a landside when required.

It will be observed that the standard 3 admits the attachment of variously-formed plows and cultivators, with facilities for adjusting them as may be needed.

The various parts of the plow-frame and attached blades, wings, and cultivators being detachably connected, enable the various parts to be adjusted with facility, permit the replacement of parts that are worn, and generally improve the construction of the plow with reference to durability, simplicity, and ease of operation.

What I claim as my invention is—

1. The combination, with a plow-beam, of a vertical standard arranged on one side of said beam, a clamping-plate placed on the opposite side of said beam, a cultivator-stock having its upper end slotted and placed over and parallel with the upper end of said standard, and bolts passed above and beneath the plow-beam and through the clamping-plate, standard, and slotted cultivator stock or shank, said bolts being provided with nuts, whereby the plow-standard and cultivator-shank are detachably and adjustably connected to the plow-beam, substantially as described.

2. The combination, with the plow-beam and a plow-standard adjustably secured to said beam, of an outwardly-bent cultivator-shank, having its upper end arranged upon said standard and adjustably secured thereto, an outwardly-inclined brace, having its upper end secured to the beam and its lower end pivotally connected to the plow-standard, and a vertical brace secured to the rear end of the plow-beam, and having its lower end adjustably connected to the cultivator-shank, substantially as described.

In testimony whereof I have affixed my signature in presence of two witnesses.

JOSEPH M. BURROWS.

Witnesses:
  B. T. ADAMS,
  L. C. RYAN.